United States Patent
Gonciulea et al.

(10) Patent No.: US 11,694,375 B2
(45) Date of Patent: Jul. 4, 2023

(54) SYSTEMS AND METHODS FOR PIXEL-BASED QUANTUM STATE VISUALIZATION

(71) Applicant: JPMORGAN CHASE BANK, N.A., New York, NY (US)

(72) Inventors: Constantin Gonciulea, Upper Arlington, OH (US); Austin Gilliam, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/178,058

(22) Filed: Feb. 17, 2021

(65) Prior Publication Data

US 2021/0256745 A1    Aug. 19, 2021

Related U.S. Application Data

(60) Provisional application No. 62/978,252, filed on Feb. 18, 2020.

(51) Int. Cl.
  *G06T 11/20*    (2006.01)
  *G06T 11/00*    (2006.01)
  *G06N 10/00*    (2022.01)

(52) U.S. Cl.
  CPC ............ *G06T 11/206* (2013.01); *G06N 10/00* (2019.01); *G06T 11/001* (2013.01)

(58) Field of Classification Search
  None
  See application file for complete search history.

(56) References Cited

U.S. PATENT DOCUMENTS

| 2012/0240072 A1* | 9/2012 | Altamura | G06T 11/206 715/771 |
| 2013/0287280 A1* | 10/2013 | Ekin | G06T 15/08 382/131 |
| 2018/0089185 A1* | 3/2018 | Romano | G06F 16/2272 |
| 2020/0044939 A1* | 2/2020 | Xia | H04L 41/12 |

OTHER PUBLICATIONS

J.Pauschenwein, B. Thaller, "Quantum-mechanical wave functions in 3D visualized with AVS."; Computers in Physics, Nov./Dec. 1996, pp. 558-566 (html, pdf); https://vqm.uni-graz.at/articles.html (Year: 1996).*

(Continued)

*Primary Examiner* — Sarah Le
(74) *Attorney, Agent, or Firm* — Greenberg Traurig LLP

(57) ABSTRACT

Systems and methods for pixel-based quantum state visualization are disclosed. In one embodiment, a computer-based method for generating a visualization of a quantum state may include: (1) receiving, at a computer program executed by a computer processor, quantum input data comprising a plurality of outcomes for a quantum state, each outcome having a phase and a magnitude; (2) for each outcome, translating, by the computer program, the outcome into a pixel having a hue based on the phase and an intensity based on the magnitude; (3) plotting, by the computer program, the pixel on a pixel graph; and (4) outputting, by the computer program, the pixel graph to an output device.

16 Claims, 13 Drawing Sheets
(11 of 13 Drawing Sheet(s) Filed in Color)

(56) References Cited

OTHER PUBLICATIONS

Hannah WM, Jones CR, Hillman BR, Norman MR, Bader DC, Taylor MA, Leung LR, Pritchard MS, Branson MD, Lin G, Pressel KG, ,"Initial results from the super-parameterized E3SM.", Journal of Advances in Modeling Earth Systems. Jan. 1, 2020;12(1) (Year: 2020).*
Overvig, Adam C., et al. "Dielectric metasurfaces for complete and independent control of the optical amplitude and phase." Light: Science & Applications 8.1 (2019): 1-12. (Year: 2019).*
QuTiP, "Visualization of quantum states and processes"; 2017, https://qutip.org/docs/latest/guide/guide-visualization.html ("QuTiP") (Year: 2017).*
Chen, Xi, et al. "A scheme of quantum state discrimination overspecified states via weak-value measurement." Physics Letters A 382.14 (2018): 942-948 (Year: 2018).*
International Search Report, dated Feb. 18, 2021, from corresponding International Application No. PCT/US2021/018562.
Written Opinion of the International Searching Authority, dated Feb. 18, 2021, from corresponding International Application No. PCT/US2021/018562.
Pauschenwein, J, et al.; "Quantum Mechanical Wave Functions in 3D Visualized With AVS", Computers in Physics, Nov./Dec. 1996, pp. 558-566, Nov. 1, 1996 (Nov. 1, 1996), pp. 1-22, XP055798321.
Thaller, Bernd; "Visualization of complex functions", Mathematica Journal, Wolfram Research, Inc., Champaign, IL, US, vol. 7, No. 2, Jan. 1, 1998 (Jan. 1, 1998), pp. 163-180, XP009138093.

* cited by examiner

SYSTEMS AND METHODS FOR PIXEL-BASED QUANTUM STATE VISUALIZATION

RELATED APPLICATIONS

This application claims priority to, and the benefit of, U.S. Provisional Patent Application Ser. No. 62/978,252 filed Feb. 18, 2020, the disclosure of which is hereby incorporated, by reference, in its entirety.

BACKGROUND OF THE INVENTION

1. Field of the Invention

Embodiments are generally directed to systems and methods for pixel-based quantum state visualization.

2. Description of the Related Art

A quantum computing system is comprised of multiple quantum bits (often referred to as qubits or qubits) and has an associated state. The state consists of one amplitude for each possible measurement outcome. FIG. 1A depicts an example of an amplitude described by magnitude r and phase $\Theta$, and FIG. 1B depicts an example of a 3-qubit state.

SUMMARY OF THE INVENTION

Systems and methods for pixel-based quantum state visualization are disclosed. In one embodiment, a computer-based method for generating a visualization of a quantum state may include: (1) receiving, at a computer program executed by a computer processor, quantum input data comprising a plurality of outcomes for a quantum state, each outcome having a phase and a magnitude; (2) for each outcome, translating, by the computer program, the outcome into a pixel having a hue based on the phase and an intensity based on the magnitude; (3) plotting, by the computer program, the pixel on a pixel graph; and (4) outputting, by the computer program, the pixel graph to an output device.

In one embodiment, a mapping table may be used to translate the hue into the phase and the magnitude into the intensity. The mapping table may include a color wheel.

In one embodiment, the method may further include selecting, by the computer program, a hue associated with a phase of 0 on the color wheel.

In one embodiment, the step of plotting, by the computer program, the pixel on a pixel graph may include identifying, from the quantum state, a prefix and a suffix. The pixel may be plotted on the pixel graph using the prefix and the suffix as axes.

In one embodiment, the prefix may correspond to an input of a quantum state and the suffix may correspond to an output of the quantum state.

In one embodiment, the method may further include causing, by the computer program, the phase and the magnitude associated with the pixel to be displayed in response to the pixel being hovered over or selected.

In one embodiment, the output device may include a display, a downstream computer system, etc. In one embodiment, the downstream computer system may identify an outlying outcome from the pixel graph.

According to another embodiment, a system for generating a visualization of a quantum state may include: an input data source comprising a plurality of outcomes for a quantum state, each outcome comprising a phase and a magnitude; an electronic device comprising at least one computer processor executing a visualization computer program that may be configured to receive, from the input data source, the plurality of outcomes, translate each outcome into a pixel having a hue based on the phase and an intensity based on the magnitude, and plot the pixels in a pixel graph; and an output device configured to receive the pixel graph from the visualization computer program.

In one embodiment, a mapping table may be used to translate the hue into the phase and the magnitude into the intensity. The mapping table may include a color wheel.

In one embodiment, the visualization computer program may select a hue associated with a phase of 0 on the color wheel.

In one embodiment, the visualization computer program may plot the pixel on the pixel graph by identifying, from the quantum state, a prefix and a suffix and plotting the pixel using the prefix and the suffix as axes.

In one embodiment, the prefix may correspond to an input of a quantum state and the suffix may correspond to an output of the quantum state.

In one embodiment, the visualization computer program may be configured to cause the phase and the magnitude associated with the pixel to be displayed in response to the pixel being hovered over or selected.

In one embodiment, the output device may include a display, a downstream computer system, etc. The downstream computer system may identify an outlying outcome from the pixel graph.

According to another embodiment, a computer-based method for interpreting a pixel graph may include: (1) receiving, at a computer program executed by a computer processor, a pixel graph comprising a plurality of pixels, each pixel representing an outcome for a quantum state and having a hue and an intensity, wherein the hue and intensity are mapped to a phase and a magnitude using a mapping table; (2) selecting, by the computer program, one of the pixels in the pixel graph; (3) determining, by the computer program, a relative phase and magnitude for an outcome associated with the selected pixel by comparing a hue and an intensity for the pixel to the hues and intensities for the other pixels in the pixel graph; and (4) outputting, by the computer program, the relative phase and magnitude.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1A:
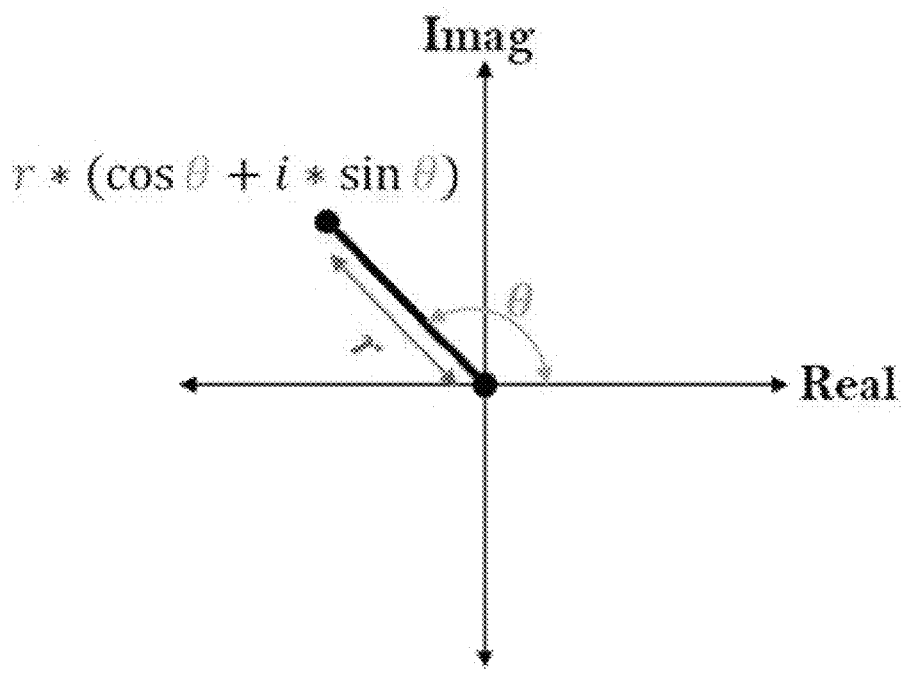
FIG. 1A depicts an example of magnitude and phase for a qubit.
Figure 1B:
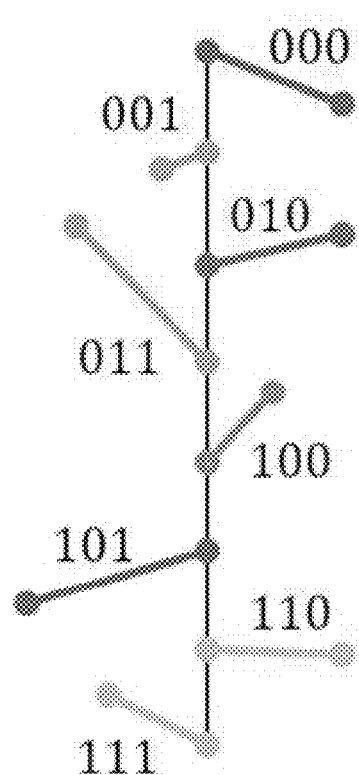
FIG. 1B depicts an example of 3-qubit state.
Figure 2A:
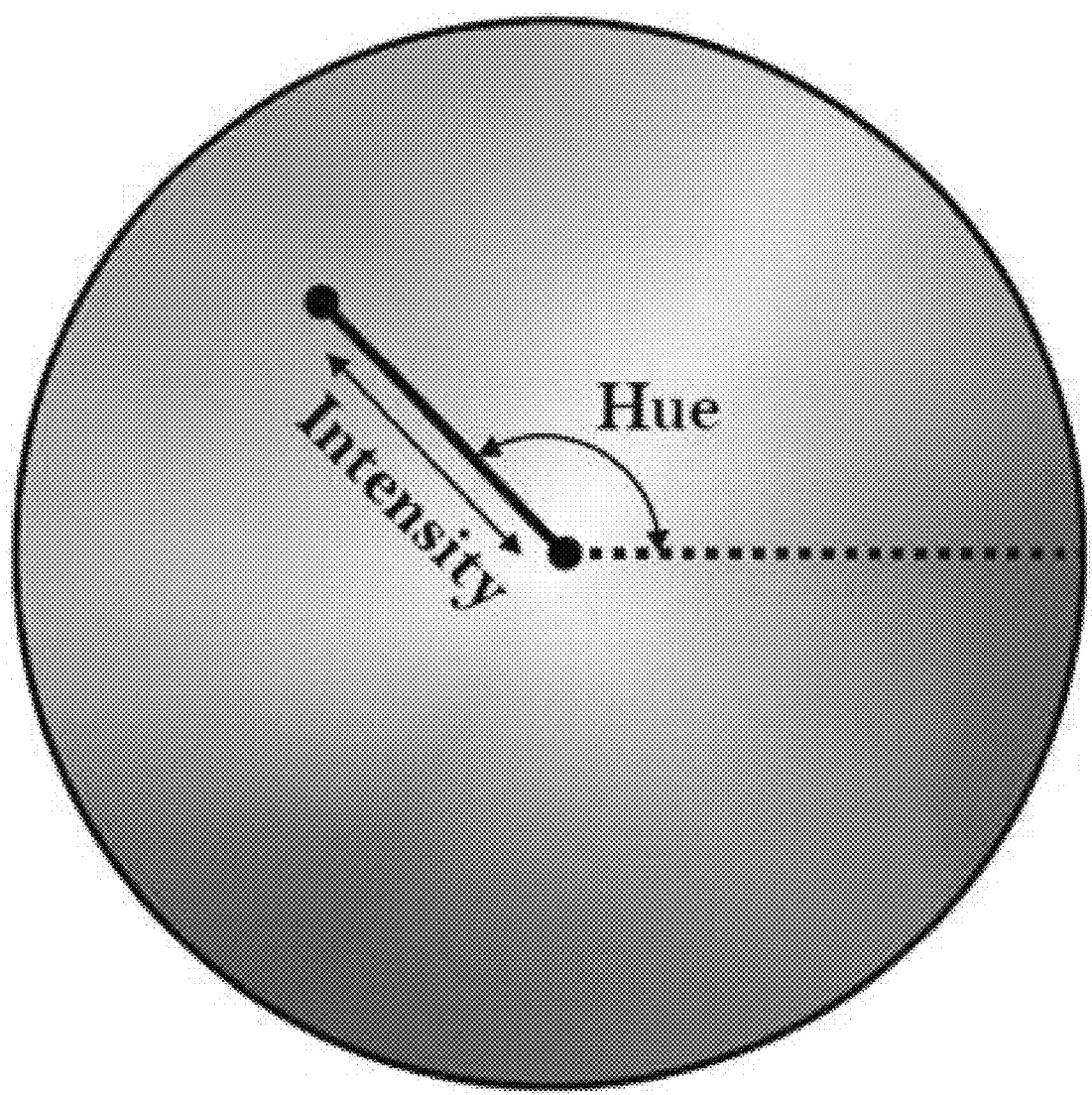
FIG. 2A is an exemplary visualization of a qubit state mapped to a hue according to an embodiment.
Figure 2B:
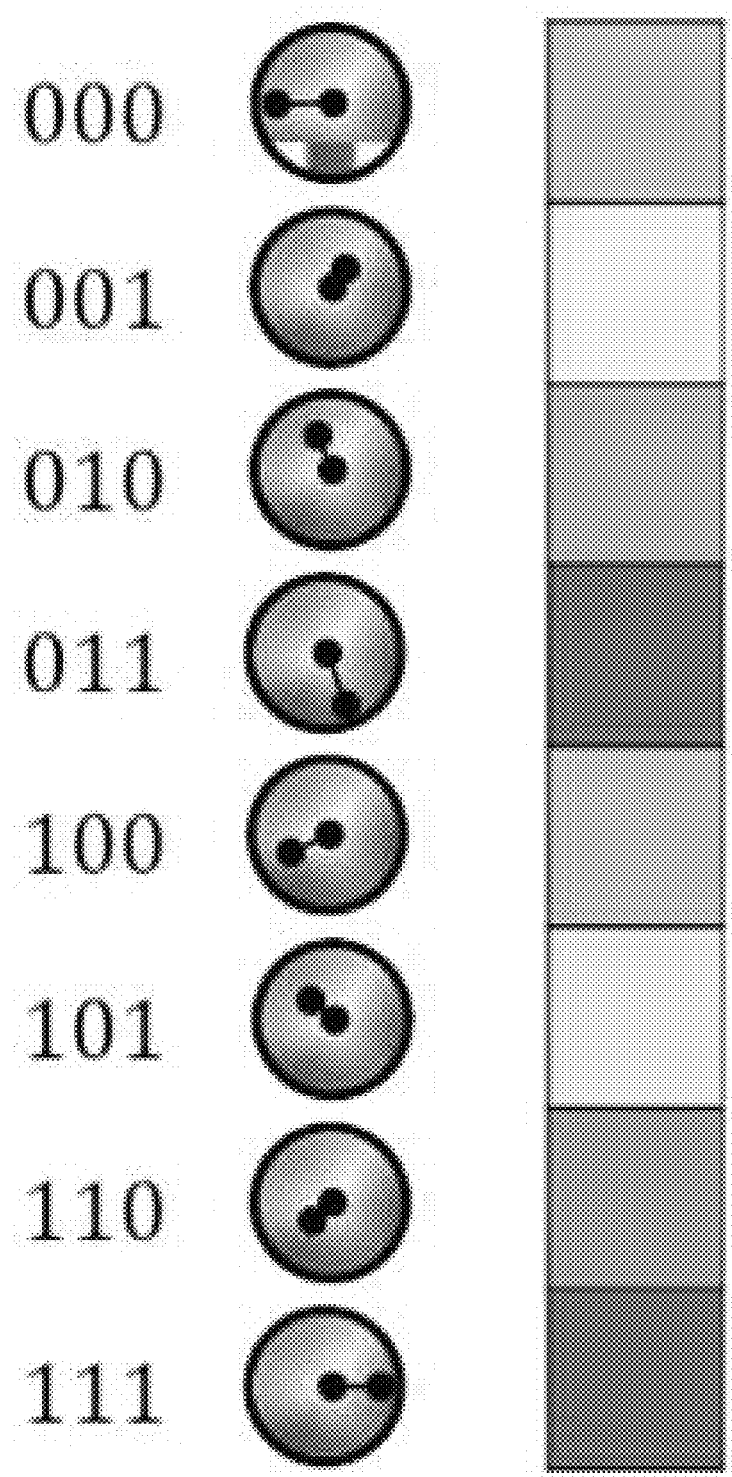
FIG. 2B is an exemplary visualization of a 3-qubit state mapped to a hue according to an embodiment.

Embodiments are directed to systems and methods for pixel-based quantum state visualization. In embodiments, the phase and amplitude of the outcomes for a quantum state may be mapped to a hue on, for example, a color wheel. For example, the phase may be associated with a hue, and the magnitude may determine the intensity of the hue. An example of such a mapping for a phase and a hue is illustrated in FIG. 2A, and an example of a visualization for the outcomes for a 3-qubit quantum state is illustrated in FIG. 2B.

Figure 3:
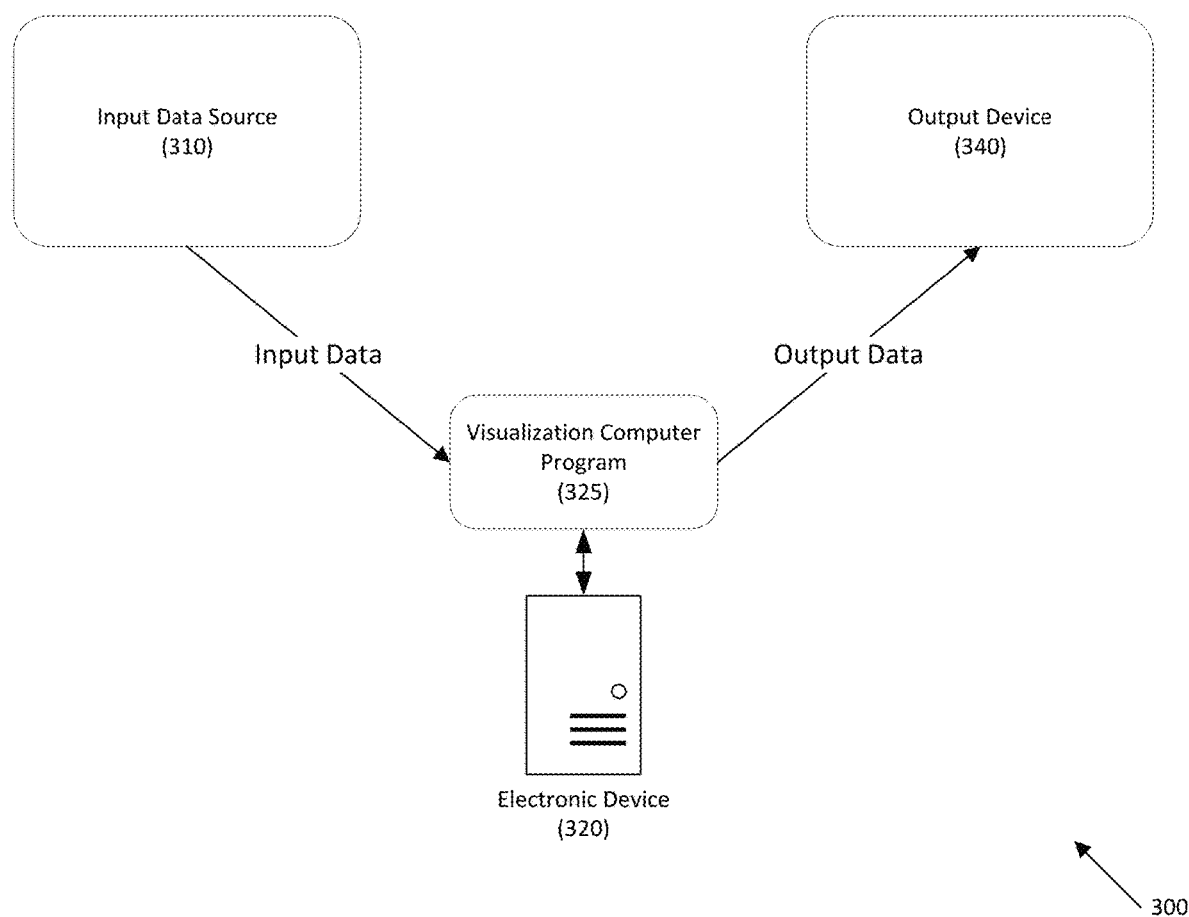
FIG. 3 depicts a system for pixel-based quantum state visualization according to an embodiment.

Referring to FIG. 3, a system for pixel-based quantum state visualization is disclosed according to one embodiment. System 300 may include input data source 310, such as the output of a quantum computer, a quantum computer simulator, data storage, etc. An example of a quantum computer simulator is disclosed in U.S. Provisional Patent Application Ser. No. 62/978,263, the disclosure of which is hereby incorporated, by reference, in its entirety. In one embodiment, the input data from input data source may be a quantum state, or any other complex number.

Input data from input data source 310 may be provided to visualization computer program 325, which may be executed by electronic device 320. Electronic device 320 may be any suitable electronic device, including servers (physical and cloud-based), workstations, laptop computers, desktop computers, notebook computers, Internet of Thing (IoT) appliances, mobile electronic devices, etc.

In one embodiment, electronic device may be part of the quantum computer or quantum computer simulator.

Visualization computer program 325 may be any suitable computer program that receives and processes the input data received from input data source 310, resulting in output data. Visualization computer program 325 may convert the input data (e.g., a complex number having a phase and magnitude) to a color, where the phase is converted to a hue, and the magnitude is converted to an intensity. The pixels may be plotted in a pixel graph, which may be provided as output data to output device 340, which may be any suitable output device, such as a display (e.g., free-standing displays, computer-based displays, mobile devices, etc.), a printing device, a computing system, etc.

The relationship between the hue and the phase may vary as is necessary and/or desired. For example, any hue may be designated to represent a phase of 0. Any suitable hue may be selected as is necessary and/or desired. In the example of FIG. 2A, the hue red was selected to represent a phase of 0; thus, all complex numbers with phase=0 will be red, with an intensity determined by the magnitude. As the phase changes, the hue that corresponds to the relative location on the color wheel also changes.

Thus, when displayed, the hue and intensity visually represent the outcomes of a quantum state. In one embodiment, flags may be included in the image generation that may include or may be linked to additional information, such as data labels, corresponding probability, etc. and the user may hover over a pixel and this information may be presented. In another embodiment, the user may "click" on a pixel for this information to be displayed.

In one embodiment, a grayscale may be used instead of color.

In one embodiment, an image, such as a pixel graph, comprising a plurality of pixels may be created. Each pixel may represent an outcome of a quantum state. The dimensions of the image may be based on splitting the binary strings (labels) provided to the visualization into a prefix (e.g., the columns) and a suffix (e.g., the rows). If no prefix is provided, in one embodiment, everything may be presumed to be in the suffix, and a single column pixel graph may be generated. For example, if the quantum state includes 6 qubits, the prefix may be set to 3 qubits and the suffix may be set to 3 qubits. Thus, a 3×3 pixel graph may be generated. This is particularly useful when there are two entangled quantum registers, such as in a quantum dictionary. For a function, the columns may represent the input x, and the rows may represent the output f(x).

The number of qubits in the prefix and the number of qubits in the suffix may depend on the quantum circuit.

Figure 4:
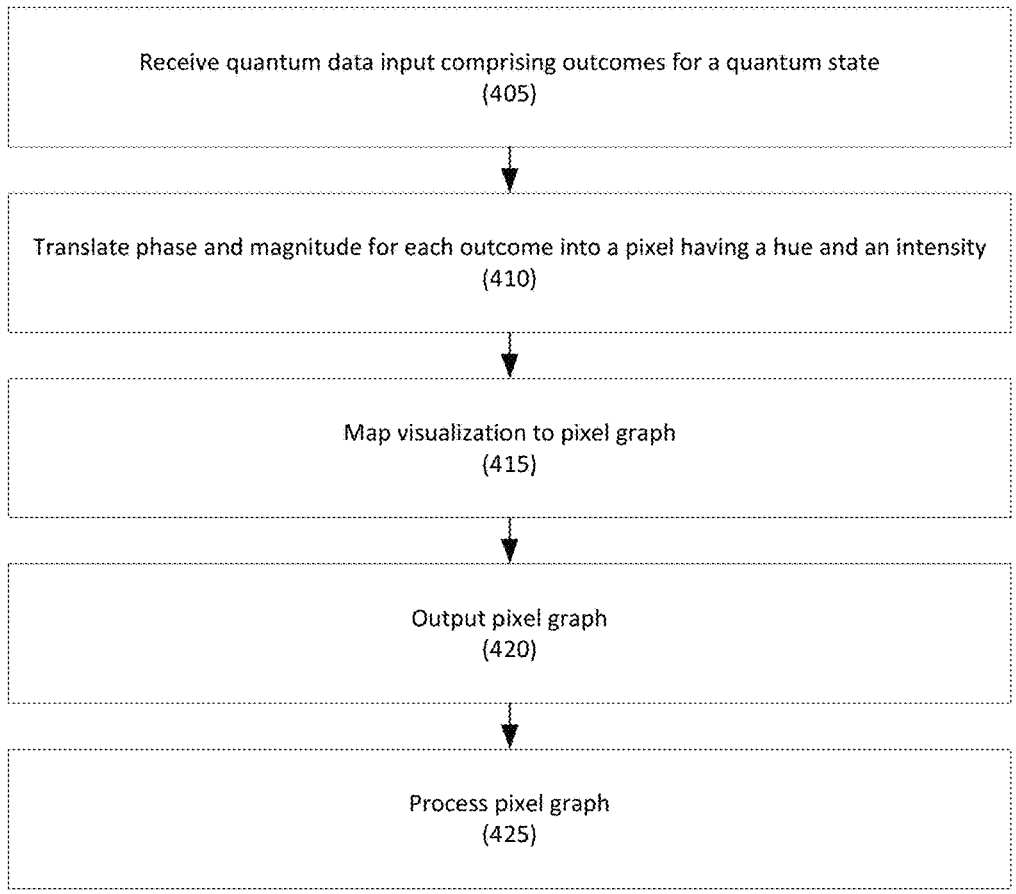
FIG. 4 depicts a method for pixel-based quantum state visualization according to an embodiment.

Referring to FIG. 4, a method for quantum state visualization is disclosed according to one embodiment. In step 405, quantum data may be received as input data from an input data source, such as a quantum computer, a quantum computer simulator, data storage, etc. In one embodiment, the quantum data may include a quantum state, which has $2^n$ outcomes, wherein n is the number of qubits. Each outcome may have a phase and a magnitude.

In step 410, the phase and magnitude for each outcome may be translated into a hue and an intensity. In one embodiment, a mapping table, color wheel, or similar that identifies a hue that is associated with a phase of zero may be used. In one embodiment, the mapping table or color wheel may be selected by the user, may be automatically selected to optimize presentation (e.g., to highlight outliers), etc. In one embodiment, the mapping table may be revised based on a plurality of translations (e.g., the mapping table or color wheel may change to optimize the visual impression as additional outcomes are processed).

In one embodiment, a "HSV" color scheme may be used. For example, the phase of the amplitude may be converted into a hue (the "H" in HSV), and the magnitude may be converted to a saturation (the "S"). This may be done for each outcome for each quantum state in the quantum data.

In one embodiment, pixels may be further converted for the display, a receiving program, the destination for the pixels, etc. For example, a HSV color scheme may be converted to a Red-Green-Blue scheme, a grayscale scheme, etc.

Figure 5:
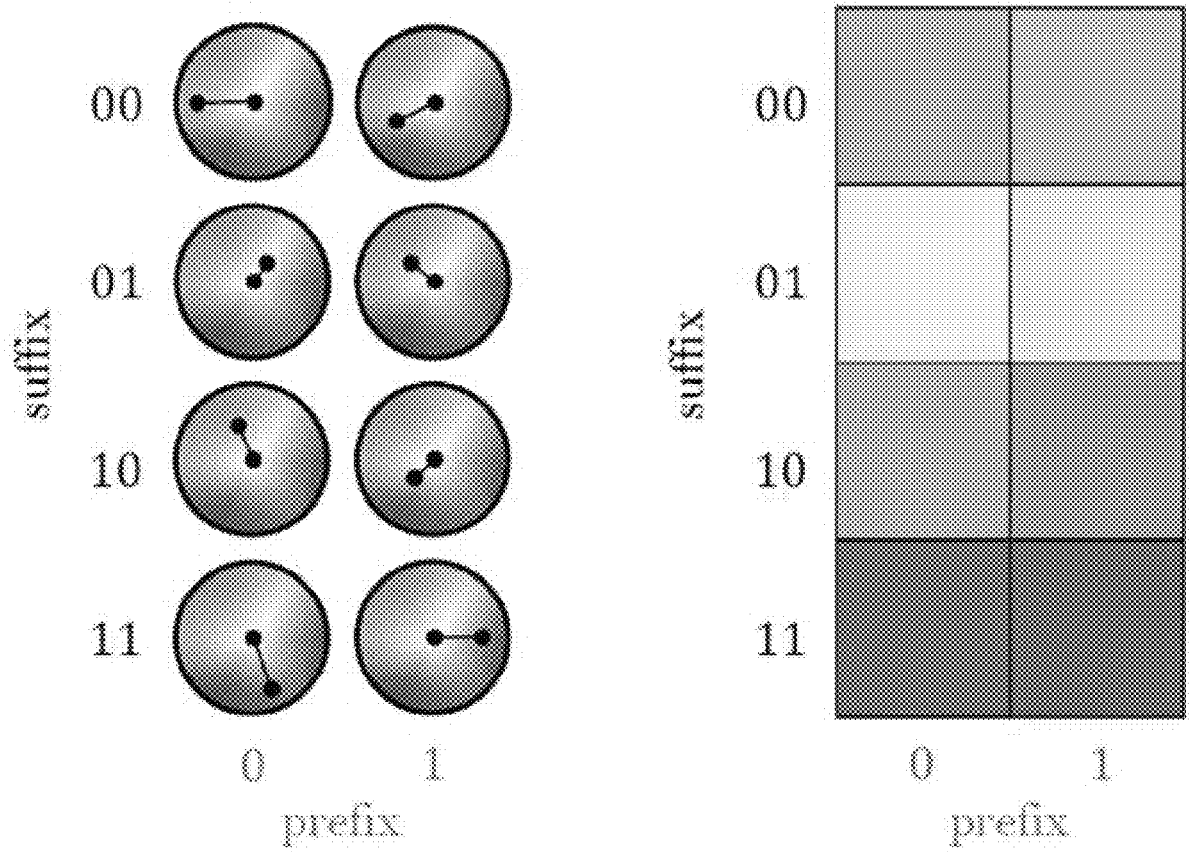
FIG. 5 depicts exemplary column formats for a pixel graph according to embodiments.

In step 415, the pixels may be plotted in an image, such as a pixel graph. In general, there are two general formats for the pixel graph—a single column (an example of which is illustrated in FIG. 2B) and a table (an example of which is illustrated in FIG. 5). In the column format, the binary labels, and thus, the pixels, may be organized in order, from 000 to 111.

In one embodiment, a prefix and a suffix for the outputs may be determined. This may be based on, for example, the quantum state being evaluated. For example, the qubits associated with the input to a function may be selected as the x-axis, and the qubits associated with the output to a function may be selected as the y-axis. Thus, for a 6-qubit state, three qubits may represent the input, and three qubits may represent the output. Thus, the input qubits may be selected as the x-axis, and the output qubits may be selected as the y-axis.

Figure 10:
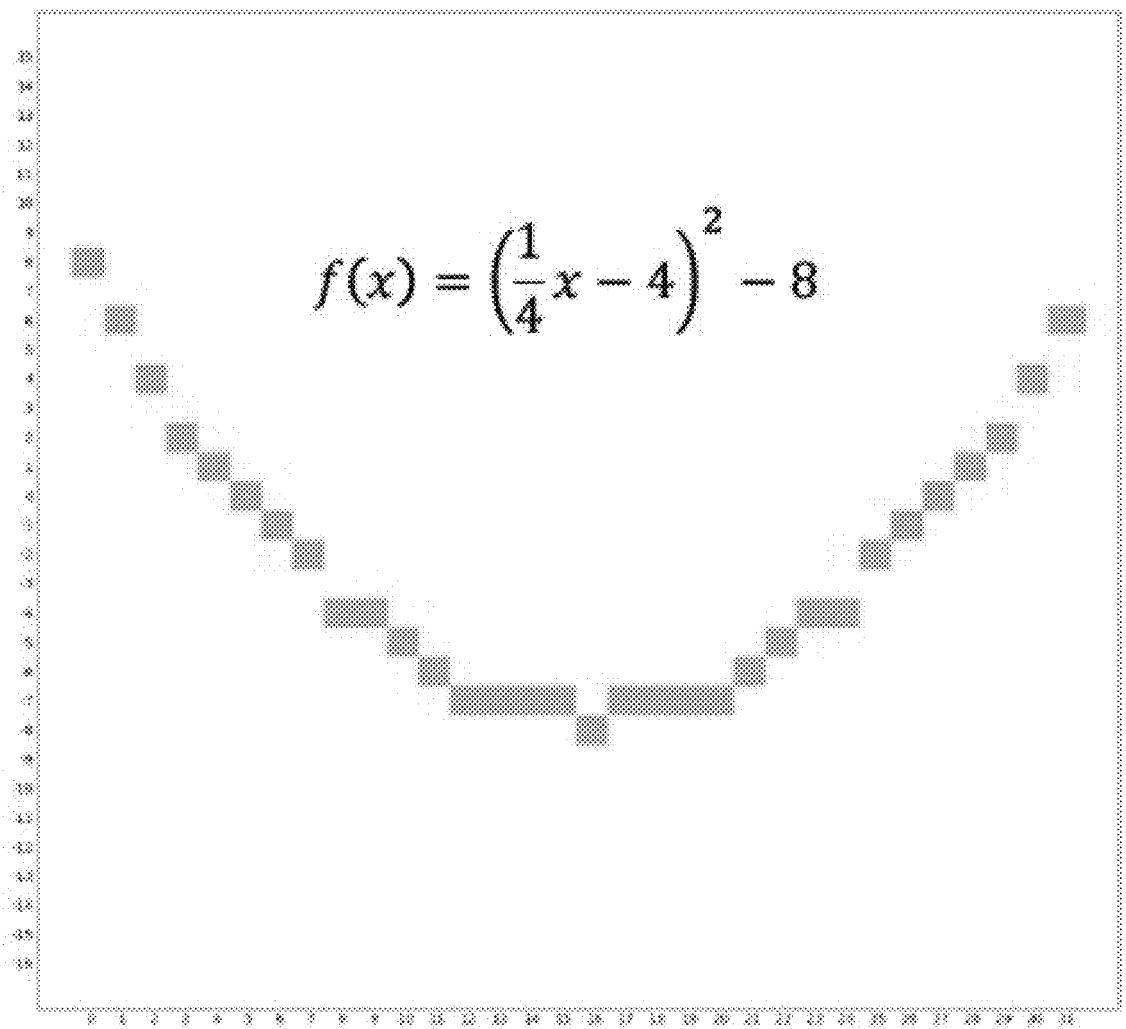
FIG. 10 depicts the encoding of an integer-valued quadratic function according to an embodiment.

FIG. 10 is an exemplary depiction of a register (a collection of qubits) that represents the input of a function, and another register that represents the output of the function. In this example, there are 5 input qubits, and 5 output qubits, meaning that there are 2^10, or 1024 possible outcomes. While this could be illustrated in a column format, in embodiments, the binary labels may be divided into a prefix (which, in this particular case, corresponds to the input, and is 5 bits long) and a suffix (in this case the output, also 5 bits long). Thus, the binary labels on the x-axis correspond to the prefix, and similar for the y-axis and the suffix. Because integers are used in FIG. 10, the binary strings may be converted directly to their integer counterparts.

In step 420, the pixel graph may be output. In one embodiment, the pixel graph may be output to a display. Any suitable display may be used as is necessary and/or desired. In one embodiment, the underlying input data may be associated with each pixel in the pixel graph, so that the underlying input data may be displayed in response to the user hovering a pointer over each pixel, by "clicking" on the pixel, etc.

In another embodiment, the pixel graph may be output to another device. For example, the pixel graph may be communicated with or without the underlying data to another device. If transmitted without the underlying data, the receiving device may interpret the data and derive and estimate for the phase and magnitude for one or more of the pixels in the pixel graph. For example, the relative phase and magnitude may be derived by comparing the pixels in the pixel graph to each other. As another example, an outlying outcome may be identified from the pixel graph.

In embodiments, communicating the pixel graph instead of the underlying data my efficiently communicate a representation of the quantum data to another device, program, etc. and may reduce the amount of bandwidth needed to communicate a representation of the quantum data.

In one embodiment, the hue associated with a phase of zero may be communicated to the device.

In one embodiment, the method may be performed with a single qubit. For one embodiment, the qubit may have a plurality of amplitudes, one correlated for outcome 0, and the other correlated one for outcome 1.

In step 425, the pixel graph may be processed. For example, classical methods for pattern recognition and/or deep learning may be applied to the pixel graph to analyze the quantum states represented by the pixels. For example, the intensity and hue reveals information about the solution space of a problem, such as location, density, probability distribution, the presence and distribution of noise, etc.

In embodiments, the information derived from the pixel graph may be used for hardware benchmarking, etc.

Several exemplary visualizations are depicted in FIGS. 5-11. It should be noted that these visualizations are exemplary only and are non-limiting.

FIG. 5 depicts an example of quantum state visualization using pixels. For example, the left side of the figure depicts the phase and magnitude of each qubit, and the right side depicts the translated hue and intensity for each qubit.

Figure 6A:
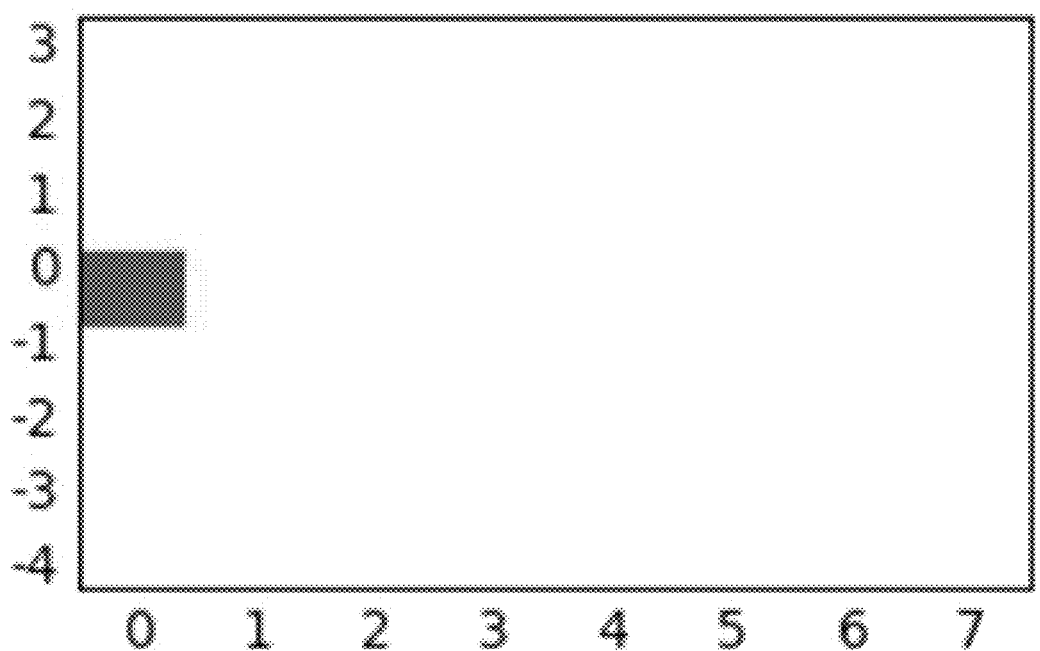
FIG. 6A depicts a default state in table format, when the only possible outcome is all 0s, according to an embodiment.
Figure 6B:
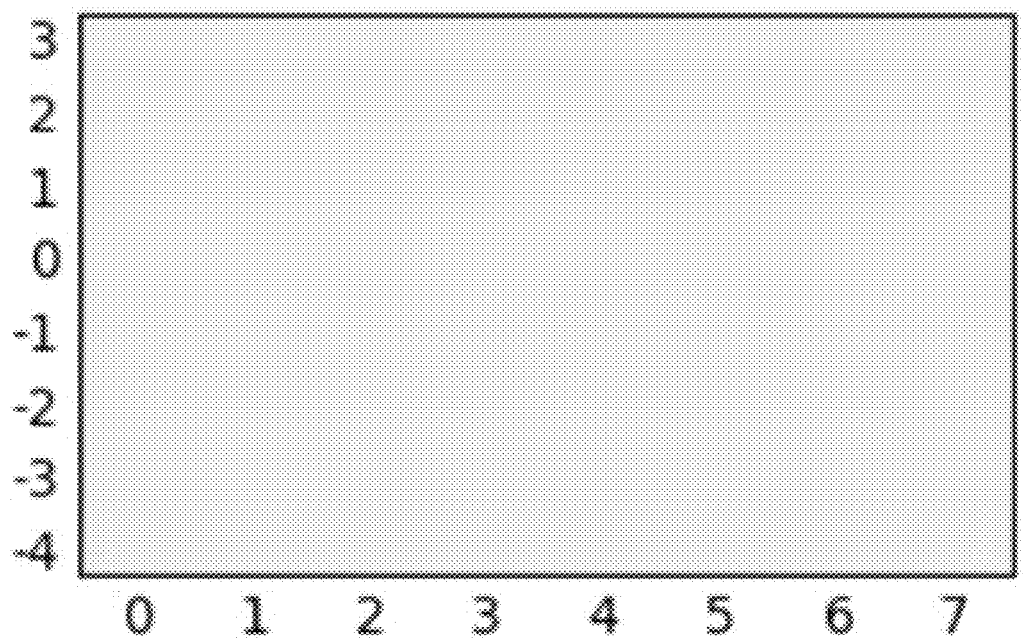
FIG. 6B depicts a state in equal superposition in table format according to an embodiment.

Referring to FIGS. 6A and 6B, examples of a default qubit state and equal superposition are illustrated, respectively.

Figure 7A:
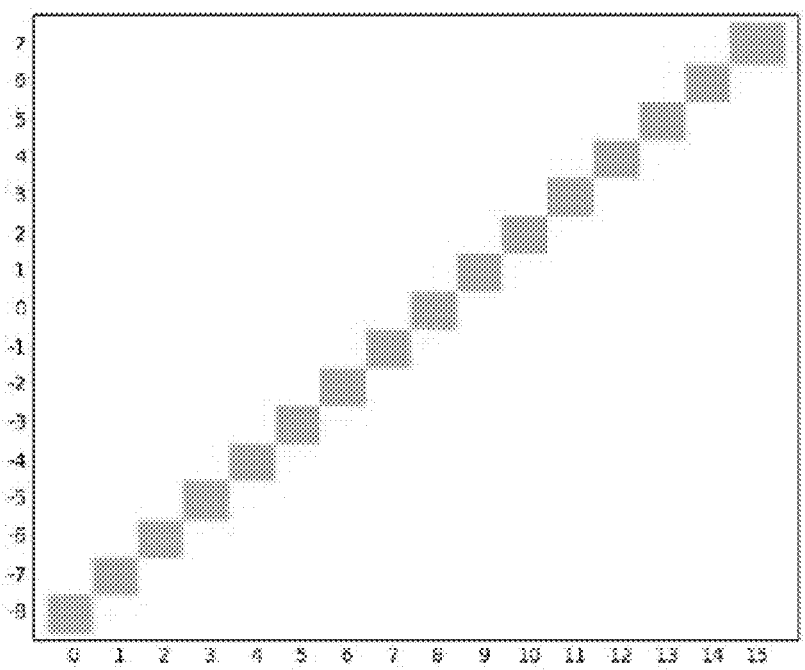
FIG. 7A depicts a linear function encoding in table format, where all values are integers according to an embodiment.
Figure 7B:
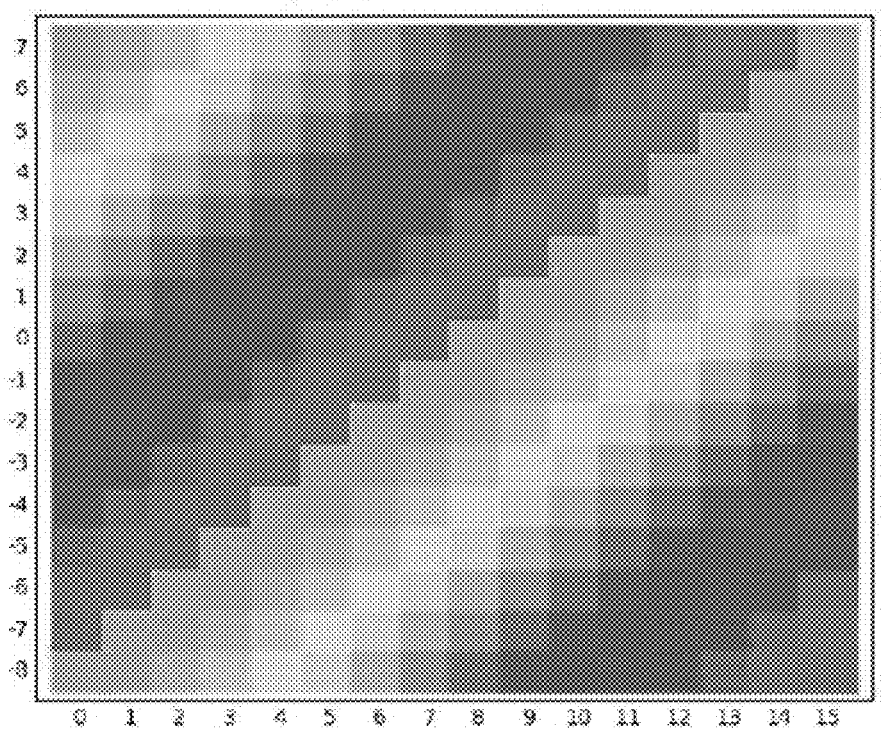
FIG. 7B depicts a similar function to FIG. 7A but with real numbers according to an embodiment.

Referring to FIGS. 7A and 7B, examples of a display resulting from encoding functions with integers and non-integers are illustrated, respectively. For example, FIG. 7A shows a linear function encoding in table format, where all values are integers, and FIG. 7B shows a similar function but with real numbers. This results in a superposition of approximations and a spectrum of hue and intensity.

Figure 8:
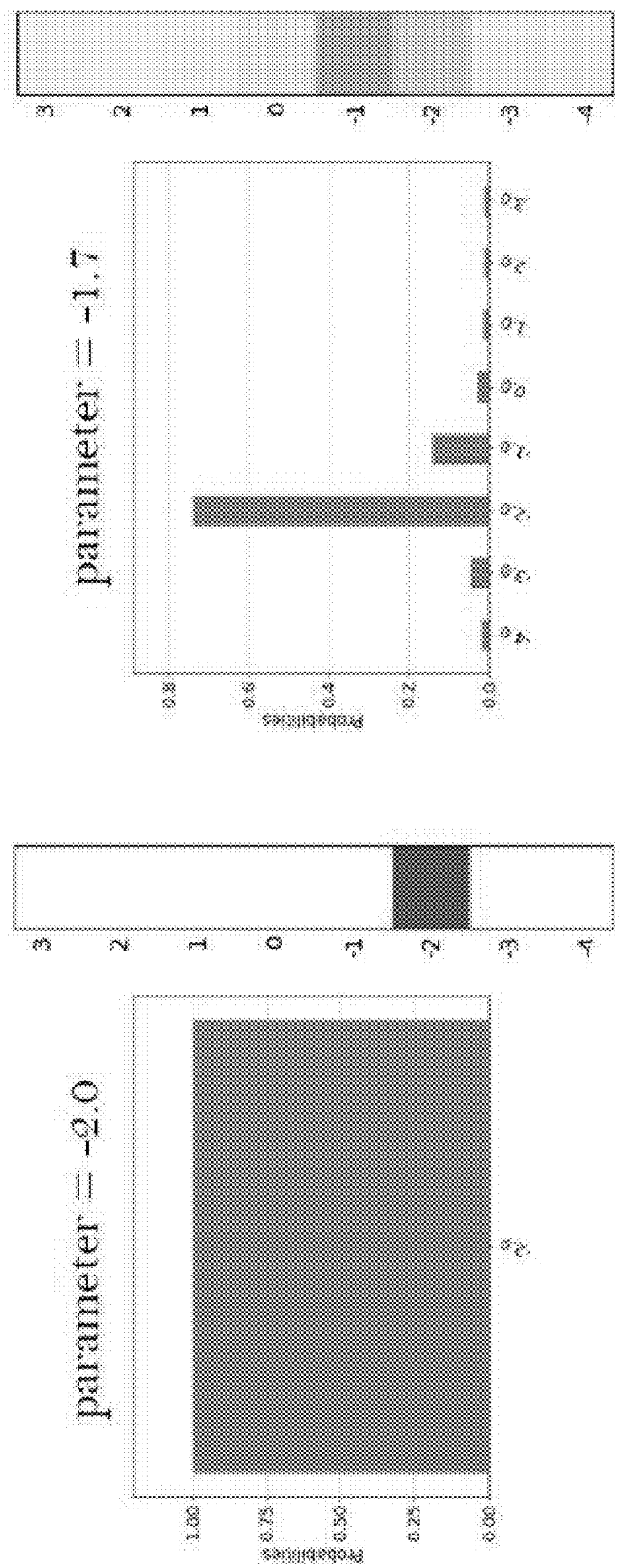
FIG. 8 depicts an example of a column format with an encoded parameter according to an embodiment.

FIG. 8 depicts an exemplary visualization of phase estimation in a column format where a parameter is encoded. In FIG. 8, a parameter (in this case an integer on the left, and a real number on the right) is encoded into the quantum state.

Figure 9:
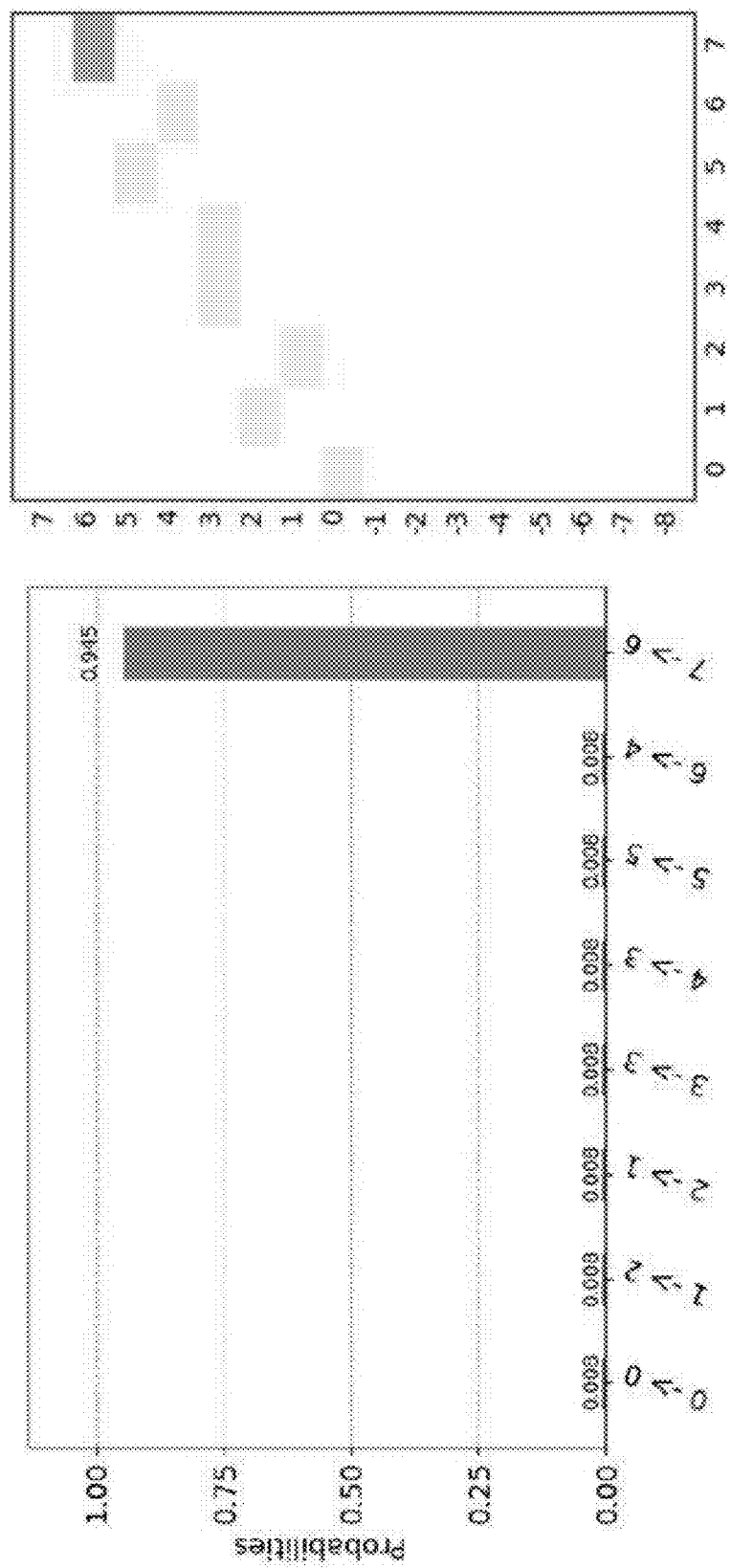
FIG. 9 depicts an example of a function encoding after several iterations of Grover Search according to an embodiment.

FIG. 9 depicts an exemplary visualization of function encoding after several iterations of Grover Search.

FIG. 10 depicts an exemplary visualization of encoding an integer-valued quadratic function.

Figure 11:
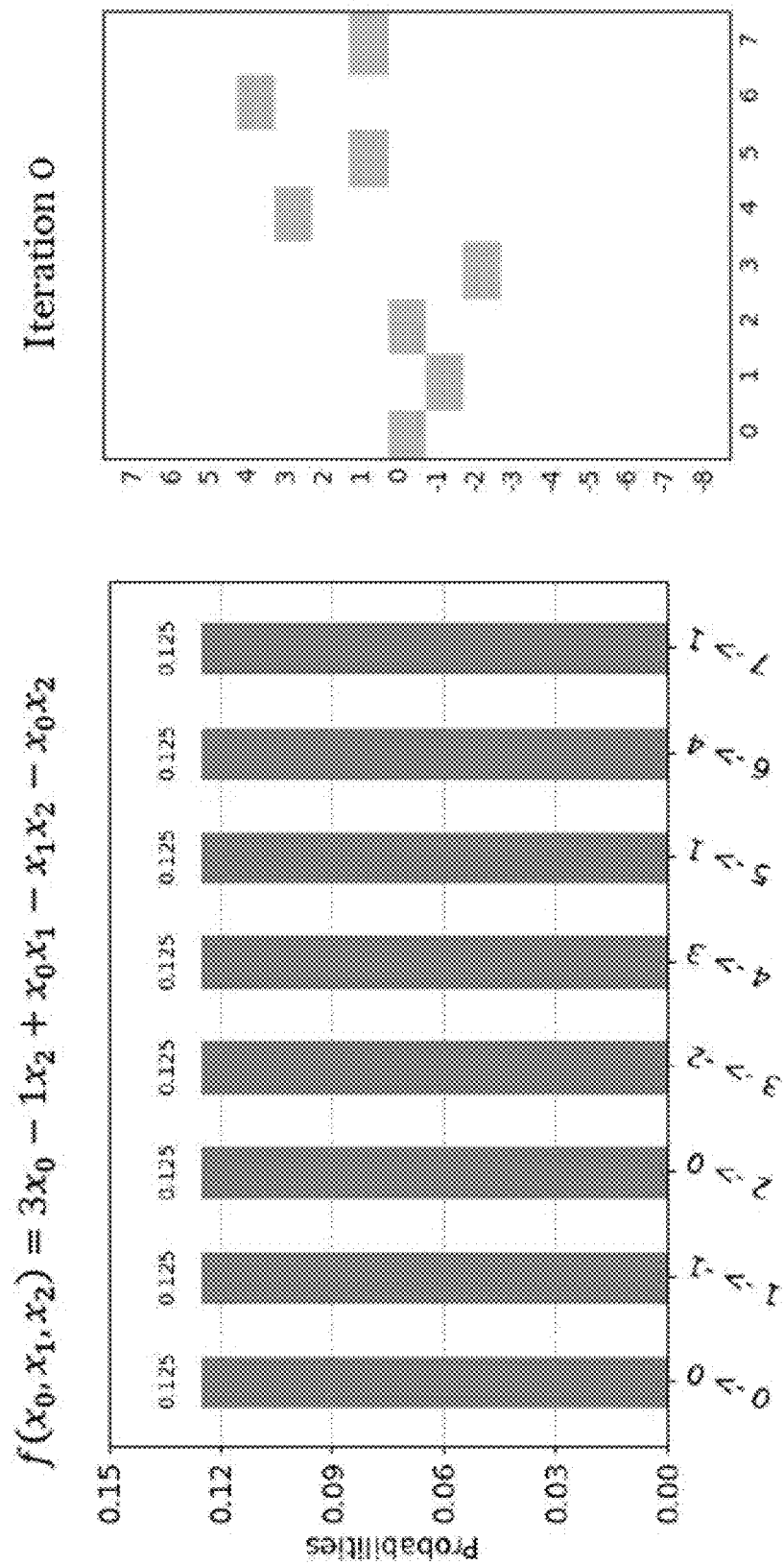
FIGS. 11 and 12 depict steps of an optimization problem according to an embodiment.
Figure 12:
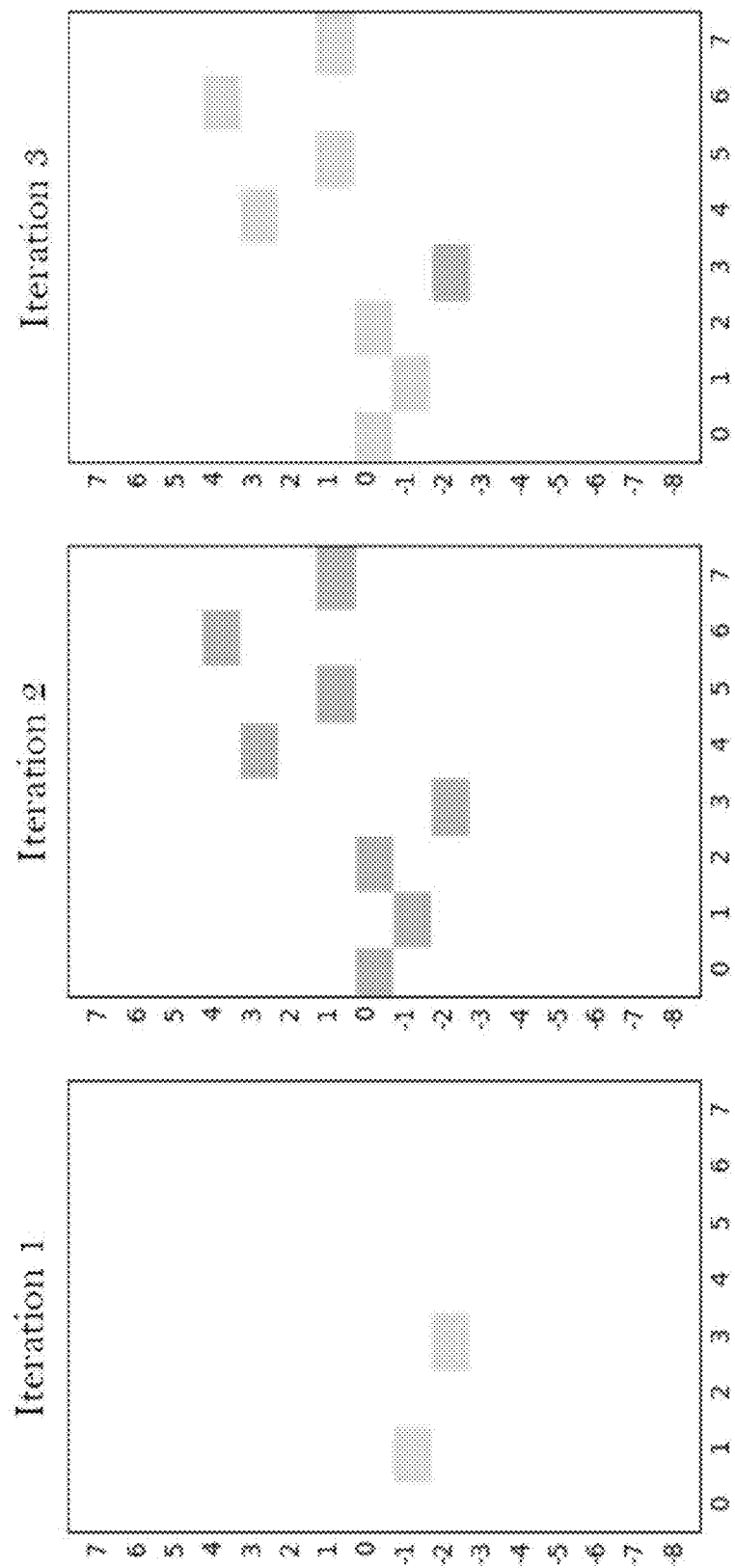

FIGS. 11 and 12 depicts exemplary visualizations of steps of an optimization problem, such as minimizing the function shown in FIG. 11. FIG. 11 depicts the initial encoding, and the three graphs in FIG. 12 depict three iterations of Grover Adaptive Search. The three graphs in FIG. 12 illustrate the phase shift (e.g., hue change) employed by Grover's Search, and the resulting magnitude amplification, depicted by the minimum value in FIG. 12, iteration 3 having the highest intensity.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-based method for generating a visualization of a quantum state, comprising:
   receiving, at a computer program executed by a computer processor, quantum input data comprising a plurality of outcomes for a quantum state, each outcome having a phase and a magnitude;
   for each outcome of the quantum state, translating, by the computer program, the outcome into a pixel having a hue based on the phase and an intensity based on the magnitude;
   identifying, by the computer program and from the quantum state, a prefix and a suffix, wherein the prefix comprises an input to a quantum function and the suffix comprises an output to the quantum function;
   plotting, by the computer program, the pixel on a pixel graph using the prefix and the suffix as axes; and
   outputting, by the computer program, the pixel graph to an output device.

2. The computer-based method of claim 1, wherein a mapping table is used to translate the hue into the phase and the magnitude into the intensity.

3. The computer-based method of claim 2, wherein the mapping table may include a color wheel.

4. The computer-based method of claim 3, further comprising:
   selecting, by the computer program, a hue associated with a phase of 0 on the color wheel.

5. The computer-based method of claim 1, further comprising:
   causing, by the computer program, the phase and the magnitude associated with the pixel to be displayed in response to the pixel being hovered over or selected.

6. The computer-based method of claim 1, wherein the output device may include a display.

7. The computer-based method of claim 1, wherein the output device may include a downstream computer system.

8. The computer-based method of claim 7, wherein the downstream computer system identifies an outlying outcome from the pixel graph.

9. A system for generating a visualization of a quantum state, comprising:
   an input data source comprising a plurality of outcomes for a quantum state, each outcome comprising a phase and a magnitude;
   an electronic device comprising at least one computer processor executing a visualization computer program that is configured to receive, from the input data source, the plurality of outcomes, translate each outcome of the quantum state into a pixel having a hue based on the phase and an intensity based on the magnitude, identify, from the quantum state, a prefix and a suffix, wherein the prefix comprises an input to a quantum function and the suffix comprises an output to the quantum function, and plot the pixels in a pixel graph using the prefix and the suffix as axes; and
   an output device configured to receive the pixel graph from the visualization computer program.

10. The system of claim 9, wherein a mapping table is used to translate the hue into the phase and the magnitude into the intensity.

11. The system of claim 10, wherein the mapping table may include a color wheel.

12. The system of claim 11, wherein the visualization computer program further selects a hue associated with a phase of 0 on the color wheel.

13. The system of claim 9, wherein the visualization computer program is configured to cause the phase and the magnitude associated with the pixel to be displayed in response to the pixel being hovered over or selected.

14. The system of claim 9, wherein the output device may include a display.

15. The system of claim 9, wherein the output device may include a downstream computer system, and the downstream computer system identifies an outlying outcome from the pixel graph.

16. A computer-based method for interpreting a pixel graph, comprising:

receiving, at a computer program executed by a computer processor, a pixel graph comprising a plurality of pixels, each pixel representing an outcome for a quantum state and having a hue and an intensity and plotted using a prefix that input to a quantum function as a first axis to the pixel graph and a suffix that comprises an output to the quantum function as the second axis to the pixel graph, wherein the hue and intensity are mapped to a phase and a magnitude using a mapping table;

selecting, by the computer program, one of the pixels in the pixel graph;

determining, by the computer program, a relative phase and magnitude for an outcome associated with the selected pixel by comparing a hue and an intensity for the pixel to the hues and intensities for the other pixels in the pixel graph; and outputting, by the computer program, the relative phase and magnitude.

\* \* \* \* \*